United States Patent
Jang

(10) Patent No.: US 7,921,464 B2
(45) Date of Patent: Apr. 5, 2011

(54) METHOD OF DOWNLOADING CONTENTS AND SYSTEM THEREOF

(75) Inventor: Hyun Seok Jang, Goyang-si (KR)

(73) Assignee: LG Electronics Inc., Seoul (KR)

( * ) Notice: Subject to any disclaimer, the term of this patent is extended or adjusted under 35 U.S.C. 154(b) by 1002 days.

(21) Appl. No.: 11/155,684

(22) Filed: Jun. 20, 2005

(65) Prior Publication Data

US 2006/0021062 A1    Jan. 26, 2006

(30) Foreign Application Priority Data

Jun. 21, 2004  (KR) .................. 10-2004-0046033

(51) Int. Cl.
  G06F 21/00    (2006.01)
  G06F 7/04     (2006.01)
  G06F 17/30    (2006.01)
  H04N 7/16     (2011.01)
  G06F 15/16    (2006.01)
  H04L 29/06    (2006.01)

(52) U.S. Cl. ............. 726/27; 705/59; 713/165; 709/219

(58) Field of Classification Search ............ 726/27; 705/59
    See application file for complete search history.

(56) References Cited

U.S. PATENT DOCUMENTS

| | | | |
|---|---|---|---|
| 6,772,340 B1 * | 8/2004 | Peinado et al. | 713/168 |
| 6,928,545 B1 * | 8/2005 | Litai et al. | 713/185 |
| 7,039,615 B1 * | 5/2006 | Gajjala et al. | 705/59 |
| 7,171,567 B1 * | 1/2007 | Bayer et al. | 713/193 |
| 7,240,365 B2 * | 7/2007 | de Jong et al. | 726/9 |
| 7,346,585 B1 * | 3/2008 | Alabraba et al. | 705/59 |
| 7,363,651 B2 * | 4/2008 | de Jong et al. | 726/7 |
| 7,380,280 B2 * | 5/2008 | de Jong | 726/27 |
| 7,389,273 B2 * | 6/2008 | Irwin et al. | 705/59 |
| 7,398,557 B2 * | 7/2008 | de Jong | 726/29 |
| 7,567,674 B2 * | 7/2009 | Nishimoto et al. | 380/281 |
| 2002/0018566 A1 | 2/2002 | Kawatsura et al. | |
| 2003/0028664 A1 | 2/2003 | Tan et al. | |
| 2003/0065917 A1 | 4/2003 | Medvinsky et al. | |
| 2003/0069904 A1 | 4/2003 | Hsu et al. | |
| 2003/0120611 A1 | 6/2003 | Yoshino et al. | |
| 2003/0131353 A1 * | 7/2003 | Blom et al. | 725/25 |
| 2003/0161473 A1 | 8/2003 | Fransdonk | |
| 2003/0236895 A1 * | 12/2003 | Ohkubo et al. | 709/229 |
| 2004/0019801 A1 | 1/2004 | Lindholm et al. | |
| 2004/0039916 A1 * | 2/2004 | Aldis et al. | 713/177 |
| 2004/0054915 A1 | 3/2004 | Jong et al. | |
| 2004/0193550 A1 * | 9/2004 | Siegel | 705/67 |
| 2004/0196981 A1 | 10/2004 | Nakano et al. | |
| 2005/0021995 A1 * | 1/2005 | Lal et al. | 713/200 |
| 2005/0044016 A1 * | 2/2005 | Irwin et al. | 705/30 |

(Continued)

FOREIGN PATENT DOCUMENTS

CN    1397045    2/2003

(Continued)

Primary Examiner — Christian LaForgia

(74) Attorney, Agent, or Firm — McKenna Long & Aldridge LLP

(57) ABSTRACT

A method of downloading content from a server to a mobile communication network and system thereof are disclosed. In particular, a method of downloading multimedia content from a server to a user equipment and a system for performing the method are disclosed. The method protects the copyright of multimedia content provided via the Internet, and prevents multimedia content from being downloaded without permission or validity.

14 Claims, 5 Drawing Sheets

U.S. PATENT DOCUMENTS

| | | |
|---|---|---|
| 2005/0071280 A1* | 3/2005 | Irwin et al. .................... 705/59 |
| 2005/0210241 A1* | 9/2005 | Lee et al. ...................... 713/158 |
| 2005/0210249 A1* | 9/2005 | Lee et al. ...................... 713/168 |
| 2005/0210279 A1* | 9/2005 | Lee et al. ...................... 713/194 |
| 2005/0216419 A1* | 9/2005 | Lee et al. ...................... 705/59 |
| 2005/0216739 A1* | 9/2005 | Lee et al. ...................... 713/168 |
| 2005/0216763 A1* | 9/2005 | Lee et al. ...................... 713/200 |
| 2006/0026691 A1* | 2/2006 | Kim et al. ...................... 726/27 |
| 2006/0149683 A1* | 7/2006 | Shimojima et al. ............ 705/59 |
| 2007/0101139 A1* | 5/2007 | Bayer et al. ................... 713/168 |
| 2007/0208668 A1* | 9/2007 | Candelore ...................... 705/57 |

FOREIGN PATENT DOCUMENTS

| | | |
|---|---|---|
| EP | 1 220 173 A1 | 7/2002 |
| JP | 2003-157334 | 5/2003 |
| JP | 2003-216500 | 7/2003 |
| JP | 2004-040741 | 2/2004 |
| JP | 2004-133576 | 4/2004 |
| JP | 2004-139323 | 5/2004 |
| JP | 2004-139433 | 5/2004 |
| KR | 1020020003375 | 1/2002 |
| KR | 1020020006127 | 1/2002 |
| KR | 1020020034974 | 5/2002 |
| KR | 102003-0097465 A | 12/2003 |
| RU | 2 189 119 | 9/2002 |
| WO | WO 03/096204 A1 | 11/2003 |

\* cited by examiner

METHOD OF DOWNLOADING CONTENTS AND SYSTEM THEREOF

This application claims the benefit of the Korean Patent Application No. P2004-0046033, filed on Jun. 21, 2004, which is hereby incorporated by reference for all purposes as if fully set forth herein.

BACKGROUND OF THE INVENTION

1. Field of the Invention

The present invention relates to a mobile communications system, and more particularly, to a method of downloading content to a mobile communication user equipment.

2. Discussion of the Related Art

Mobile communication user equipment, for example, mobile terminals, are becoming more and more diversified with regard to the functionality they provide. For example, most mobile communication terminals support both data and voice communications. In particular, the mobile communication terminals are configured to receive various multimedia content from specific server via wireless Internet connections.

Internet providers provide various services for downloading or receiving multimedia content, such a music, video, and the like, via wireless connections. Common music formats include mp3, wav, and midi files, and common video formats include MPEG2 and MPEG 4.

FIG. 1 is a flowchart illustrating a method of downloading content according to the related art. As shown in FIG. 1, user equipment 1 accesses a content server and provides its authentication information to the content server 2. The content server 2 authenticates or verifies the authentication information provided. The authentication information generally includes a unique user identifier (ID) and a password. The user equipment 1, may also provide a request for specific content.

If the authentication fails, the content server 2 informs the user equipment 1 of the 'authentication failure', and requests retransmission of the authentication information from the user equipment 1. Alternatively, if the authentication succeeds, the content server 2 informs the user equipment 1 of the 'authentication success'. If the user equipment 1 requested specific content, the content server 2 downloads the requested content to the user equipment 1. Otherwise, the user equipment upon being notified of the successful authentication provides a request to the server for specific content.

In providing such a service of downloading content, issues of content rights are currently raised. Specifically, multimedia content such as music, video, and the like have become more serious problems.

Nowadays, various Internet providers and/or personal or home operators upload multimedia content to servers without validity, thereby occasionally infringing content rights. Moreover, even if permission is granted, the content should only be put on a server for the permitted duration. However, many providers fail to abide by the limited permission.

SUMMARY OF THE INVENTION

Accordingly, the present invention is directed to a method of downloading content and system thereof that substantially obviates one or more problems due to limitations and disadvantages of the related art.

An advantage of the present invention is to provide a method of downloading multimedia content and system thereof, which actively protects the rights of multimedia content owners.

Additional features and advantages of the invention will be set forth in the description which follows, and in part will be apparent to from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, there is provided a method of downloading content in a user equipment, comprising: receiving a right to use content from a first server; transmitting a request to receive desired content in response to receiving the right to use content; and receiving the requested desired content from a second server.

In another aspect of the present invention, there is provided a method of downloading content in at least one server, comprising: generating a right to use content in a first server; receiving a request from user equipment to download desired content; transmitting a right to use desired content to the user equipment; validating a right to use content in a second server; transmitting the desired content from the second server to the user equipment if the right to use content is valid.

In another aspect of the present invention, there is provided a method of downloading content from at least one server to user equipment, comprising: receiving a right to use content from a first server; transmitting from the user equipment a request to receive desired content to a second server in response to receiving the right to use content; validating by the second server the right to use content; and transmitting the desired content to the user equipment if the right to use content is valid.

In anther aspect of the present invention, there is provided one or more servers providing content to user equipment, the one or more servers comprising: means for communicating with the user equipment; means for providing right to use information; means for receiving a request from the user equipment to download desired content, wherein the request includes at least a part of the right to use information; means for authenticating right to use information; and means for downloading content to the user equipment in response to the received request from the user equipment.

In another aspect of the present invention, there is provided a system for downloading content from at least one server to user equipment, comprising: a first server providing a right to use content; a second server providing content; and a user equipment receiving the right to use content from the first server, requesting a download of content from the second server using the received right to use content, and storing the right to use content provided from the first server, and the content provided from the second server.

In another aspect of the present invention, there is provided user equipment, comprising: means for communicating with a plurality of servers; means for receiving right to use information; means for providing a request to download desired content from a server, wherein the request includes at least a part of the right to use information; and means for downloading content from a server.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention.

In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Figure 3:
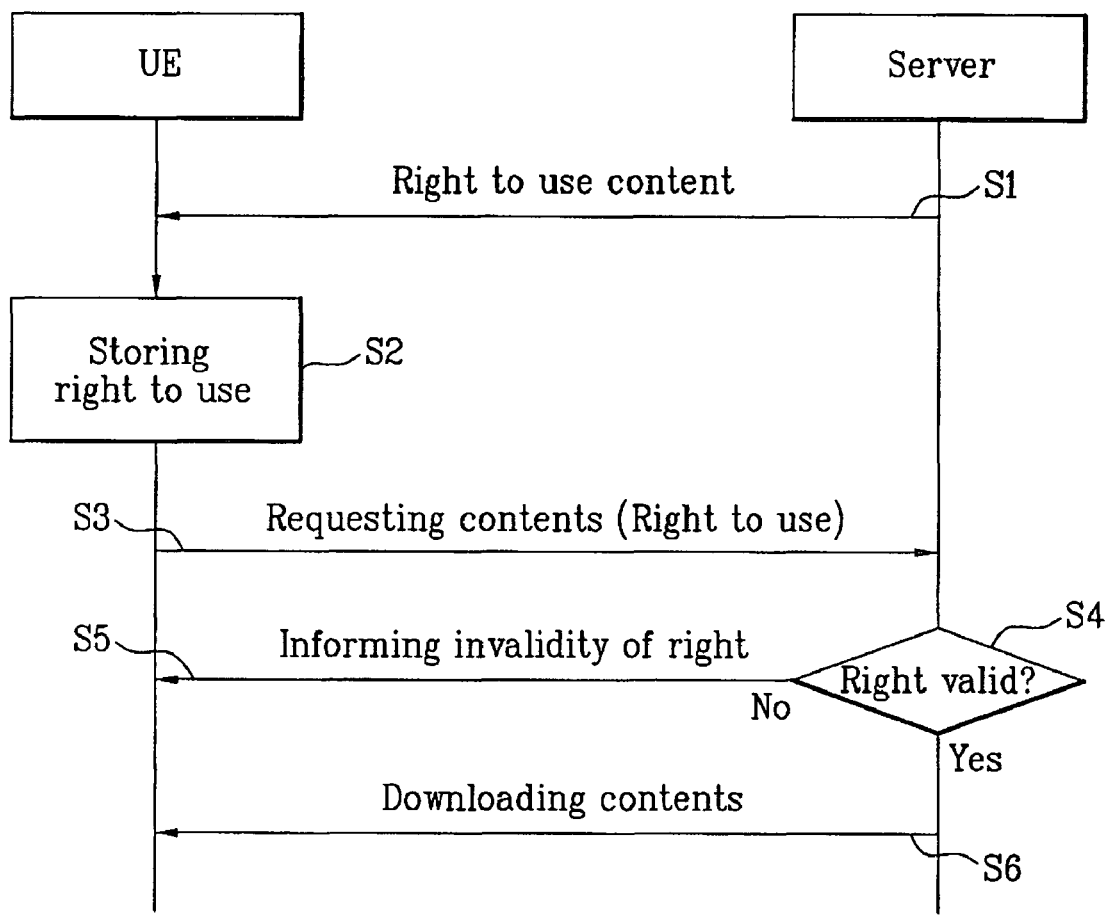
FIG. 3 is a flowchart of a method of downloading content according to a first embodiment of the present invention.

FIG. 3 is a flowchart of a method of downloading content according to a first embodiment of the present invention. As shown in FIG. 3, a user accesses a server via user equipment and requests a download of specific content. The server provides a right to use the content to the user equipment instead of downloading the corresponding content to the user equipment instantly (S1). The right to use, may includes a content title, a usable period, the copyright proprietor, the copyright proprietor's secret key and the copyright proprietors' signatures.

Figure 1:
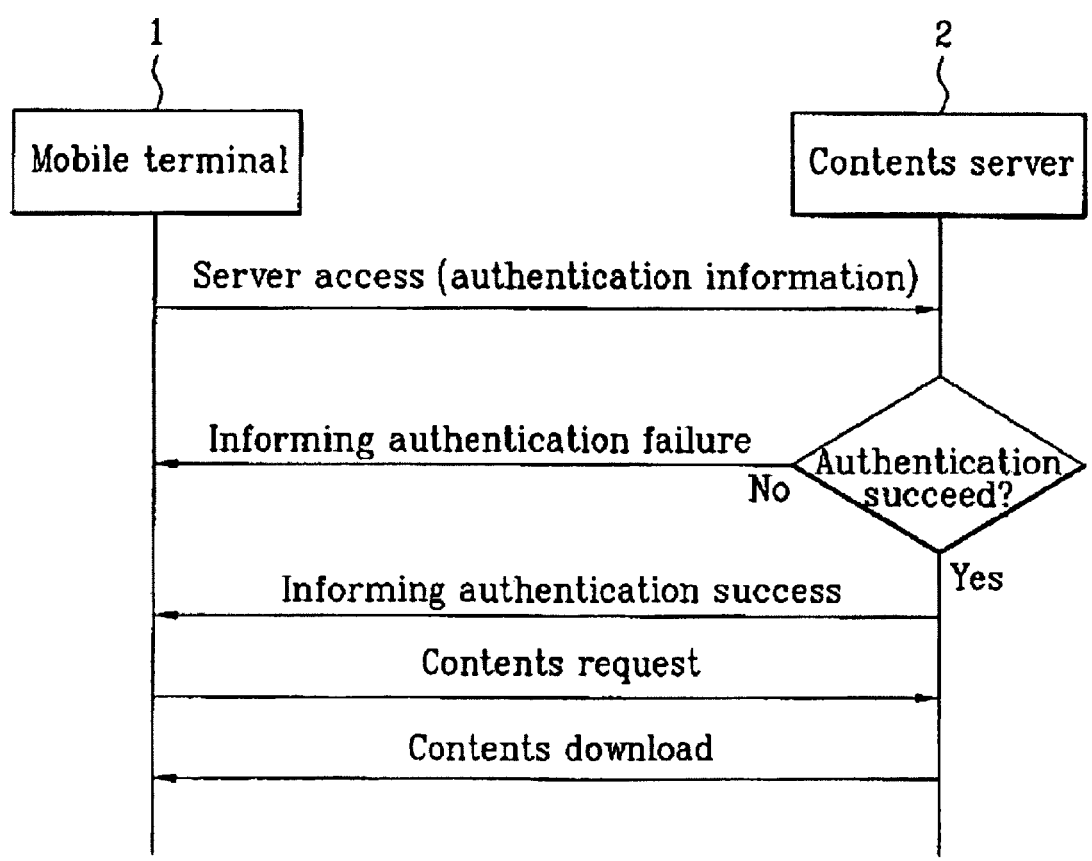
FIG. 1 is a flowchart of a general content downloading procedure.
Figure 2:
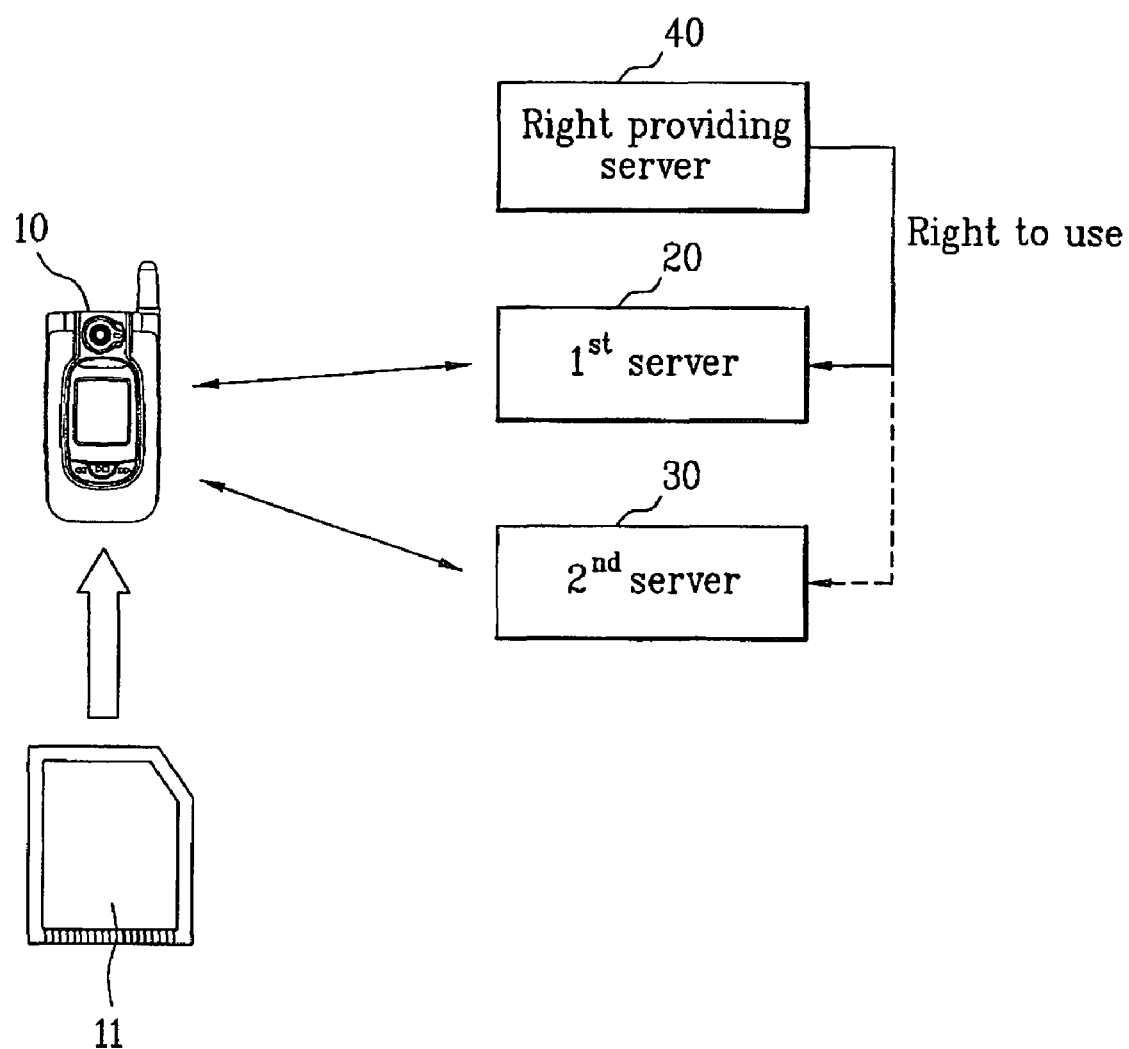
FIG. 2 is a block diagram of a content downloading system according to an embodiment of the present invention.

Specifically, the server generates the right to use, which includes the information discussed above, and downloads the right to use to the user equipment 10 (FIG. 2). The user equipment 10 stores the downloaded right to use in memory (S2). The memory may be built-in the user equipment 10 or detachable memory 11 (FIG. 2). If the user equipment 10 includes detachable memory 11, it is preferable to store the downloaded right to use in the detachable memory 11. This allows the user to keep using the right to use stored in the detachable memory 11 even if the user equipment 10 is replaced.

Thereafter, the user equipment accesses the server using the previously stored right to use and requests a download of the corresponding content from the accessed server (S3). Upon receipt of a download request, the server determines whether the right to use the request content was provided from the user equipment with the download request. If the right to use was not provided with the download request, the server generates a right to use and downloads the right to the user equipment as discussed above. If the right to use was provided, the server determines the validity of the provided right to use (S4).

Subsequently, if the right provided from the user equipment is valid, the server downloads the corresponding requested content to the user equipment (S6). In contrast, if the right provided from the user equipment is invalid, the server notifies the user equipment that the right is currently invalid (S5).

Figure 4:
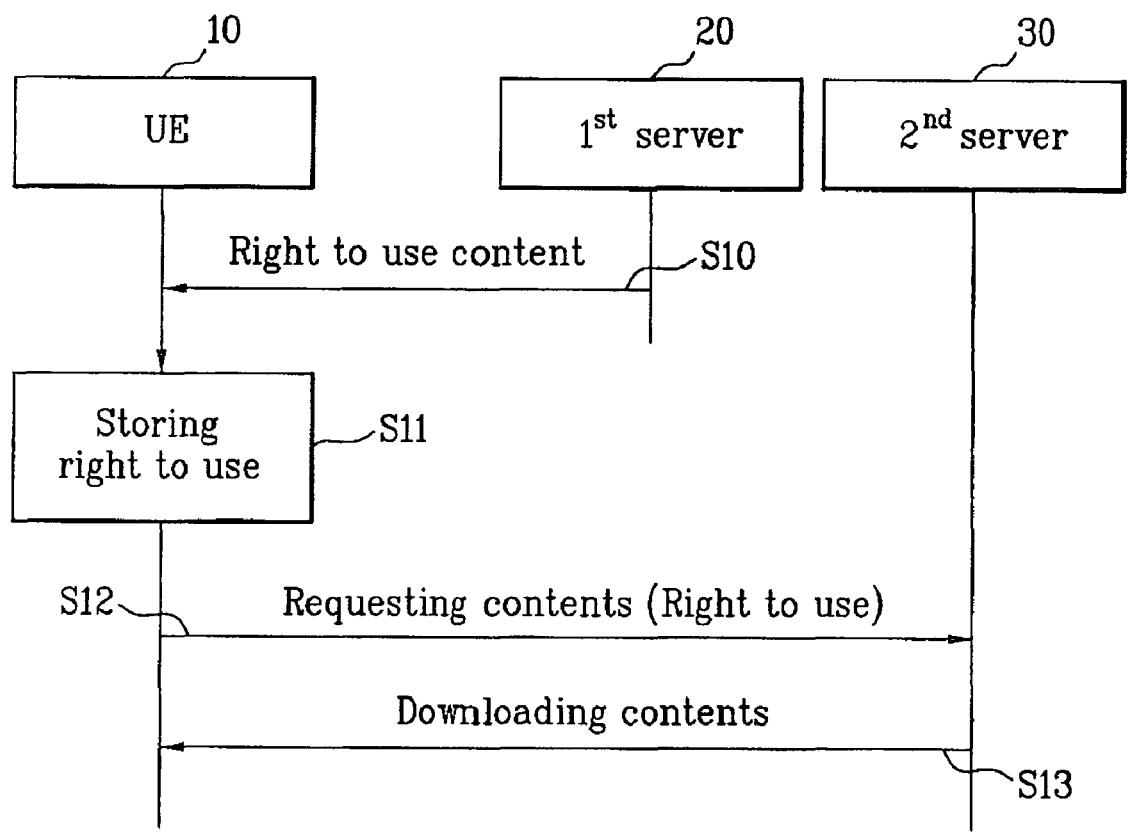
FIG. 4 is a flowchart of a method of downloading content according to a second embodiment of the present invention.

FIG. 4 is a flowchart of a method of downloading content according to a second embodiment of the present invention. As shown in FIG. 4, a user accesses a first server 20 via user equipment 10 and requests a download of a right to use specific content. Upon receipt of the request, the first server 20 provides the right to use the specified content to the user equipment 10 (S10). As in the first embodiment, the right may include a content title, a usable period, the copyright proprietor, the copyright proprietor's secret key and the copyright proprietors' signatures. Specifically, the first server 20 generates the right to use including above-identified information and downloads the generated right to the user equipment 10.

The user equipment 10 stores the downloaded right to use in memory (S11). The memory may be built-in the user equipment 10 or detachable memory. If the user equipment 10 includes detachable memory, it is preferable to store the downloaded right to use in the detachable memory. This allows the user to keep using the right to use stored in the detachable memory even if the user equipment is replaced.

Thereafter, the user equipment 10 accesses a random second server 30 using the previously stored right to use and requests a download of the corresponding content from the accessed second server 30 (S12). Upon receipt of the download request, the second server 30 downloads the requested corresponding content to the user equipment 10 (S13).

Figure 5:
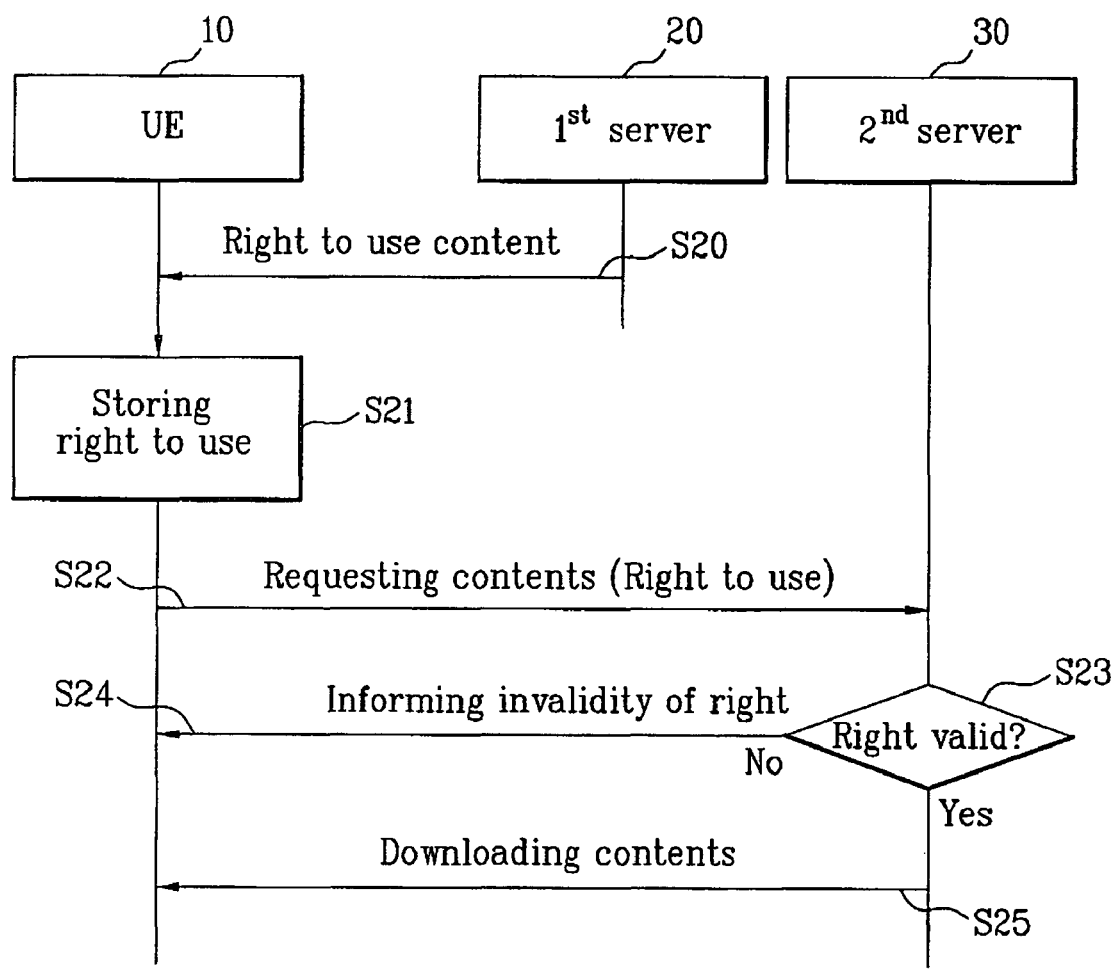
FIG. 5 is a flowchart of a method of downloading content according to a third embodiment of the present invention.

FIG. 5 is a flowchart of a method of downloading content according to a third embodiment of the present invention. As shown in FIG. 5, a user preferentially accesses a first server 20 via user equipment 10 and then requests a download of a right to use specific content. Upon receipt of the download requests, the first server 20 provides the right to use to the user equipment 10 (S20).

The right may includes content title, a usable period, a copyright proprietor, a copyright proprietor's secret key and copyright proprietors' signatures. Specifically, the first server 20 generates the right including the above-explained information and downloads the generated right to the user equipment 10. The user equipment 10 stores the downloaded right in a corresponding memory (S21).

Thereafter, the user equipment 10 accesses a random second server 30 using the previously stored right and requests a download of the corresponding content from the accessed second server 30 (S22). The second server 30 determines the validity of the right to use provided from the user equipment 10 (S23).

If the right to use provided from the user equipment 10 is valid, the second server 30 downloads the corresponding requested content to the user equipment 10 (S25). In contrast, if the right to use provided from the user equipment 10 is invalid, the second server 30 notifies the user equipment 10 that the right is currently invalid (S24).

In the above embodiments of the present invention, the server authenticates the right to use provided from the user equipment by comparing a right retained in the server to the right provided from the user equipment with the request to download the content. For example, the server compares the content title of the right, the usable period, the copyright proprietor's secret key and the copyright proprietor's signature received from the user equipment to information retained by the server when it generated the right to use and determines the validity of the right according to a result of the comparison. The server may check whether the usable period has expired, whether the copyright proprietor's secret key matches, and/or whether the copyright proprietor's signature coincides.

To determine the validity of the right, the server retains various information included in the right previously provided from another server that provides the right to use the content. The server updates these information periodically to reflect any changes in the right to use.

In the above embodiments of the present invention, the user equipment provides unique identification information granted to the user equipment to the server in requesting the content or the right to use the content from the server. These identification information may include a mobile identification number (MIN) period with the subscription of the user equipment, an electronic serial number (ESN) of a mobile terminal and the like. Moreover, the identification information is not limited to the MIN and/or ESN. Since MEID (mobile equipment identifier) or IMSI (international mobile subscriber identity) are used in the next generation mobile communication terminal, the identification information is not limited to the MIN and/or ESN but adopts any identification information intrinsically granted to the user equipment.

The server having acquired the unique identification information of the user equipment bills the user referencing the identification information of the user equipment after content has been downloaded and/or after a right to use the content has been downloaded.

According to another embodiment of the present invention, if the right to use included with a download request is valid, the server downloads an execution key for the content to the user equipment after downloading the requested content to the user equipment. The execution key is needed to execute the content in the user equipment. Thus, in case that the corresponding content are executed when the content and the corresponding execution key are completely downloaded, it is preferable to follow the following procedures.

If a request to download specific content is made by the user equipment, the server downloads the requested content and the right to use the content to the user equipment. Thereafter, the user accesses the server via the user equipment so that the server can authenticate the right to use. In doing so, if the right of the user equipment is valid, the server downloads the execution key of the corresponding content to the user equipment. The user equipment then executes the content previously downloaded from the server and stored therein, with the execution key downloaded from the server.

FIG. 2 is a block diagram of a content downloading system according to an embodiment of the present invention. As shown in FIG. 2, the content downloading system according to the present invention includes user equipment 10 and a plurality of servers 20, 30 and 40.

According to the first embodiment of the invention, the first server 20 provides both the content and the right to use the content to the user equipment 10. Preferably, the present invention further includes a content-using right providing server 40 that provides the right to use the content to the first or second server 20 or 30. Optionally, it is also possible that the first server 20 includes a function of the content-using right providing server 40.

According to how the system of the present invention is implemented, the first server 20 itself generates the right to use to provide to the user equipment 10 or the first server 20 is provided with the content-using right from the content-using right providing server 40 to provide the right to the user equipment 10. In the following description, it is assumed that the content-using right providing server 40 is separately provided.

The first server 20 according to the first embodiment includes a receiving engine, a database, an authentication engine and a content downloading engine. The receiving engine receives a right to use prescribed content from the content-using right providing server 40. The database stores the content and the right to use the content received via the receiving engine. The database periodically updates the stored content and/or the right to use the content. Namely, the database updates the right to use the content previously provided from the content-using right providing server 40 into a latest version.

The authentication engine determines the validity of the right to use and provides the right to use the requested content to the first server 20 when requesting user-specific content from the server 20. The authentication engine recognizes the content requested by the user equipment 10 and then determines the validity of the right to use received from the user equipment 10.

If the right to use the content is not valid, the authentication engine notifies the user equipment 10 that the right is invalid, requests retransmission of the right or to update the right.

The content downloading engine refers to a result of the validity decision made by the authentication engine. If being notified by the authentication engine that the right to use from the user equipment 10 is valid, the content downloading engine downloads the content to the user equipment 10, and, the content downloading engine of the first server 20 downloads the right to use prescribed content to the user equipment 10.

If the right to use from the user equipment 10 is valid, the first server 20 of the present invention downloads the corresponding requested content to the user equipment 10. The first server 20 may also download an execution key for the downloaded content to the user equipment 10.

The first server 20 according to the second embodiment includes a database and a download engine. The database stores and periodically updates a right to use content. Namely, the database updates the right to use the content previously provided from the right providing server 40 into a latest version.

The download engine downloads the corresponding right to use when a request is made by the user equipment 10.

According to the first embodiment of the present invention, the second server 30 makes no action. The second server 30 according to the second embodiment includes a receiving engine, a database, an authentication engine and a content downloading engine.

The receiving engine receives a right to use specific content from the right providing server 40. The database stores and periodically updates the content and the right to use the content received via the receiving engine. Namely, the database updates the right to use the content previously provided from the right providing server 40 into a latest version. In this case, the right stored in the database of the second server 30 is used for authentication.

The authentication engine determines the validity of the right to use from the user equipment 10. The user equipment 10 provides the right to use to the second server 30 when requesting specific content from the second server 30. The authentication engine recognizes the content requested by the user equipment 10 and determines the validity of the right to use received from the user equipment 10. If the right to use is not valid, the authentication engine notifies the user equipment 10 that the right is invalid. In addition, the authentication engine requests retransmission of the right or to update the right.

The content downloading engine refers to a result of the validity decision made by the authentication engine. If notified by the authentication engine that the right to use from the user equipment 10 is valid, the content downloading engine downloads the corresponding content to the user equipment 10.

In addition, the second server 30 may also download an execution key for the downloaded content to the user equipment 10. For this, the second server 30 further includes an engine to download the key for executing the content. In this case, the execution key is a key necessary for the user equipment 10 to execute the content.

The user equipment 10 according to the first embodiment requests the content and/or the content-using right from the first server 20 and then stores the content and/or the content-using right provided from the first server 20. Specifically, the user equipment 10 includes a detachable chip memory to store the downloaded content and/or right to use.

The user equipment 10 according to the second embodiment receives the right to use from the first server 20 and requests the corresponding content from the second server 30 using the received right to use. The user equipment 10 stores the right to use provided from the first server 20 and the content provided from the second server 30. Specifically, the user equipment 10 includes a detachable chip memory to store the downloaded content and/or right to use.

The right to use includes at least one of a content title, a usable period, a copyright proprietor, a copyright proprietor's secret key and a copyright proprietor's signature. If an execution key is use, the copyright proprietor's secret key is used in encrypting the execution key.

The user equipment 10 receives the right to use (right object) and then extracts the secret key from the right. Then the user equipment 10 decrypts the execution key using the extracted secret key. Hence, the content are executed using the decrypted execution key.

The present invention is explained in detail as follows with reference to the configuration shown in FIG. 2. In downloading content to user equipment, execution of content is enabled via authentication of a right to use the content.

First, a user accesses a server via user equipment and requests a download of specific content. The server downloads the requested content and a right to use the content to the user equipment. The right to use may include the title of the downloaded content, a usable period, a copyright proprietor, a copyright proprietor's secret key and copyright proprietors' signatures. The user equipment links the downloaded content and the right to use the content together to store in a memory.

Thereafter, the user accesses the server via the user equipment and provide the right to use. The server determines the validity of the right to use provided from the user equipment and transmits a message including a key for executing the corresponding content if the right to use is valid. Thus, the server includes an engine for downloading the content and the right to use and an engine for authenticating the right to use of the user equipment.

If the right to use provided from the user equipment is valid, the corresponding result of authentication is an authentication success message. A valid usable period is set up for the authentication success message. Namely, the authentication success message is usable during a predetermined valid period only.

In contrast, if the right to use provided from the user equipment is invalid, the server side notifies the user equipment of authentication failure. The server may also request a retransmission of the right to use from the user equipment or notify the user equipment that the right needs to be updated.

Thereafter, the user again requests the download of the requested content to the server or to a random server via the user equipment. In doing so, the user equipment provides the downloaded authentication result to the server or the random server. As can be understood by the above description, the user can have the corresponding content downloaded from the random server retaining the user-requesting content as well as from the server only if having the authentication result.

If so, the server or the random server confirms the authentication result provided from the accessing user equipment and then downloads the corresponding content to the user equipment. Namely, if the authentication success message is provided from the user equipment, the server side or the random server downloads the corresponding content to the user equipment. In addition, the server or the random server may further download an execution key for executing the content together with the content to the user equipment.

The user equipment stores the authentication result downloaded from the server and the content (and execution key) downloaded from the server side or the random server.

The server providing the right to use to the user equipment retains the usable period of the right to use. Moreover, the server side frequently updates the retained content-using right.

The method of downloading content and system thereof according to the present invention provide the following advantages or effects.

First of all, the content-using right can be actively protected against infringement. In particular, the present invention can previously prevent various Internet providers or personal home page operators from infringing copyrights of multimedia content such as music, video and the like without authorization.

And, the present invention enables the various Internet providers or personal home page operators to provide or download multimedia content to business users by the expiry of the term only, thereby facilitating a copyright proprietor to secure her or his content royalty.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of downloading content in user equipment, comprising:
    receiving desired content and a right to use content associated with the desired content from a first server, wherein the first server receives the right to use content from a content-using right providing server for providing the user equipment with the right to use content, the right to use content is also provided from the content-using right providing server to a second server, and the second server stores the right to use content;
    transmitting a request to receive the desired content to the second server, after receiving the desired content from the first server;
    receiving the requested desired content from the second server, if the right to use content received from the first server is same with the right to use content stored in the second server;
    receiving an encrypted execution key for executing the requested desired content from the second server, if the right to use content received from the first server is same with the right to use content stored in the second server and the requested desired content has been downloaded by the user equipment; and
    decrypting the encrypted execution key using a secret key included in the right to use content.

2. The method of claim 1, further comprising: storing the right to use the content in the user equipment.

3. The method of claim 1, further comprising: receiving an indication of whether or not the right to use content is valid from the second server.

4. The method of claim 1, wherein the right to use content includes at least one of a title, a usable period, a copyright proprietor, a copyright proprietor's secret key and a copyright proprietor's signature.

5. The method of claim 1, wherein the request to receive desired content includes unique identification information assigned to the user equipment.

6. The method of claim 1, further comprising: storing the right to use content in the user equipment.

7. The method of claim 1, further comprising: receiving an authentication success message from the second server, if the right to use content received from the first server is the same as the right to use content stored in the second server, wherein the authentication success message is usable for a predetermined period.

8. The method of claim 1, further comprising: receiving an authentication failure message from the second server if the right to use content received from the first server is not same with the right to use content stored in the second server.

9. The method of claim 8, wherein if the right to use content received from the first server is not same with the right to use content stored in the second server, the user equipment is notified that the right to use the content needs to be updated from the second server.

10. A system for downloading content from at least one server to user equipment, comprising:
    a content-using right providing server providing a right to use content to a first server and a second server;
    the first server providing a right to use content;
    a second server providing content, having an engine to download an encrypted execution key for the execution of the content, and storing the right to use content provided from content-using right providing server; and
    a user equipment receiving the right to use content from the first server, requesting a download of content from the second server using the received right to use content after receiving the content from the first server, and storing the right to use content provided from the first server, and the content provided from the second server if the right to use content stored in the user equipment is same with the right to use content stored in the second server;
    wherein the user equipment receives the encrypted execution key for the execution of the content provided from the second server, if the right to use content stored in the user equipment is same with the right to use content stored in the second server and the requested content from the second server has been downloaded by the user equipment, and the user equipment decrypting the encrypted execution key using a secret key included in the right to use content.

11. The system of claim 10, wherein the user equipment includes detachable memory to store the content and the right to use content.

12. The system of claim 10, wherein the right to use content includes at least one of a title of the content, a usable period, a copyright proprietor, a copyright proprietor's secret key and a copyright proprietor's signature.

13. The system of claim 10, wherein the first server comprises:
    a database storing the right to use content, the database periodically updating the right to use content; and
    a content downloading engine downloading the right to use content stored in the database to the user equipment.

14. The system of claim 10, wherein the second server comprises:
    a database storing the content;
    an authentication engine determining validity of the right to use content provided by the user equipment in requesting the download of the content; and
    a content downloading engine downloading the content to the user equipment with reference to a result of deciding the validity by the authentication engine.

* * * * *